Dec. 21, 1943.   R. C. HOLMES   2,337,044
MAPPING MACHINE
Filed Aug. 10, 1942
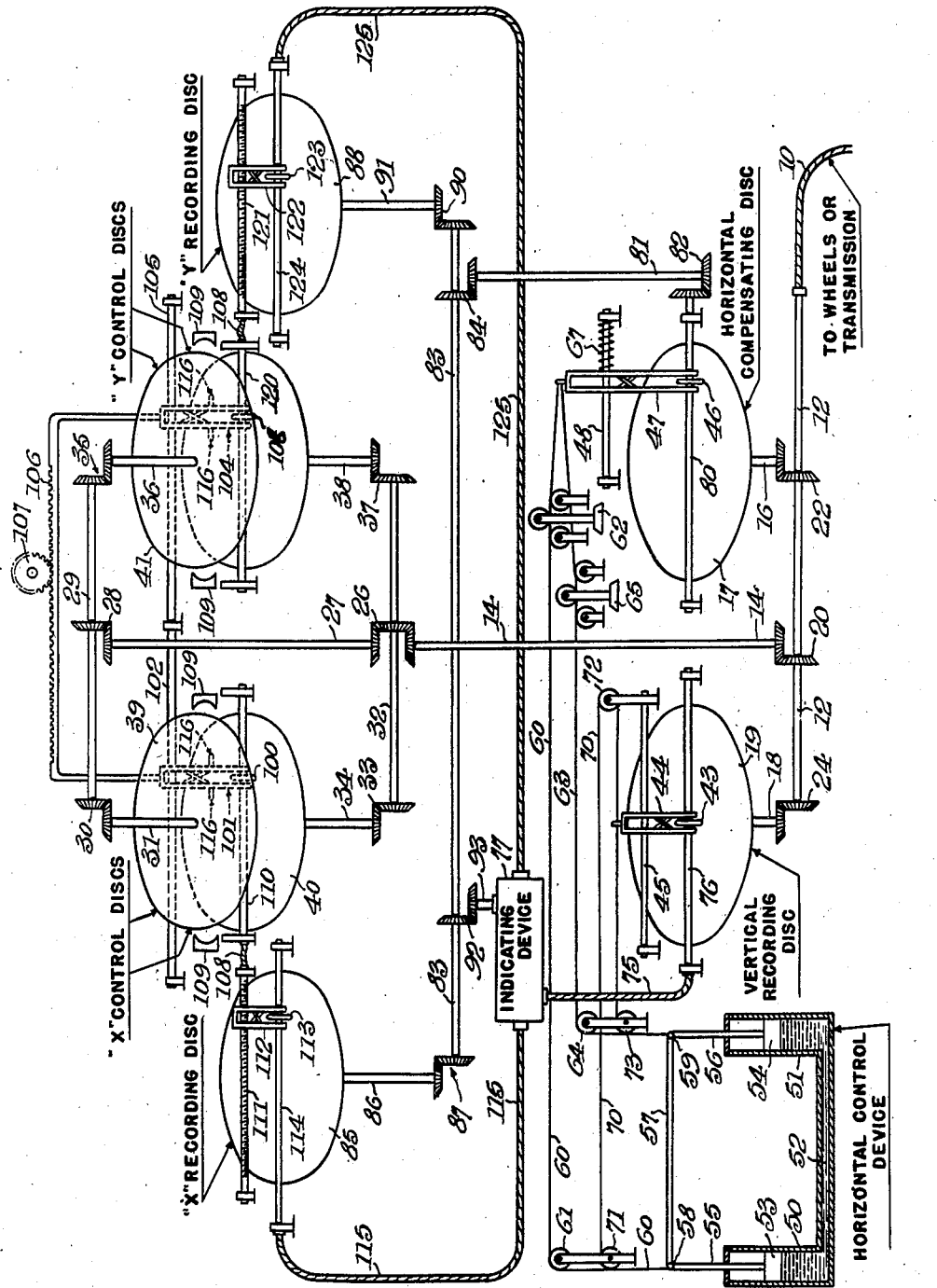
INVENTORS
ROLAND C. HOLMES
IRVING SAROKIN
BY
ATTORNEYS Patented Dec. 21, 1943

2,337,044

UNITED STATES PATENT OFFICE 2,337,044

MAPPING MACHINE

Roland C. Holmes, United States Army, Newport News, Va., and Irving Sarokin, United States Army, Durham, N. C.

Application August 10, 1942, Serial No. 454,294

7 Claims. (Cl. 33—141.5)

(Granted under the act of March 3, 1883, as amended April 30, 1928; 370 O. G. 757)

The invention described herein may be manufactured and used by or for the Government for governmental purposes, without payment to us of any royalty thereon.

This invention relates to mapping machines, and more particularly to a machine for recording horizontal and vertical deviations made by the machine while the machine is traversed over the actual terrain to be mapped.

It is an object of this invention to provide a mapping machine which will plot the direction and elevation of the path followed by the machine and which will plot a closed traverse.

It is a further object of this invention to provide a plotting machine which automatically integrates the slope over which the machine passes whereby a true horizontal trace is produced.

These and other objects and advantages of the invention will be apparent upon a consideration of the following description of an embodiment of the invention when taken in conjunction with the accompanying drawing in which there is represented diagrammatically the arrangement of the apparatus whereby the objects of the invention are obtained.

In designing any map making machine, consideration should be given to the fact that in travelling over a slope, the actual mileage is not a true measurement of the horizontal distance covered. That is, in covering the same amount of surface, the vehicle will move over a greater horizontal distance the less the slope, the exact horizontal distance covered being in direct proportion to the cosine of the angle of slope. Since the majority of such machines receive their power from a wheel or transmission, it is impossible, without some sort of compensating device, to produce a scale drawing which is accurate.

Referring to the drawing, it will be seen that there has been provided a series of interconnected discs operating friction wheels engaged therewith. The driving force is obtained through a cable 10 connected to the wheels or transmission of the vehicle upon which the apparatus is carried, by any suitable arrangement such as is common in speedometer practice. The vertical recording disc 19 is driven through the following path: shaft 18, gearing 24, drive shaft 12 and cable 10. Power to drive the horizontal compensating disc 17 is taken from the drive shaft 12 by means of gearing 22 and shaft 16. Connected to the drive shaft 12 by means of gearing 20 is an auxiliary drive shaft 14. Secondary shafts 27, 29 and 32 are driven by the auxiliary shaft 14 by gearing 26 and 28. The lower "$x$" control disc 40 receives power from the secondary shaft 32 through shaft 34 and gearing 33 while the lower "$y$" control disc 42 is driven from the secondary shaft 32 through shaft 38 and gearing 37. The upper "$x$" control disc 39 and the upper "$y$" control disc 41 are similarly driven from secondary shaft 29 by means of shaft 31 and gearing 30, and shaft 36 and gearing 35, respectively. All of the gearing arrangements are given a unity ratio whereby the upper and lower "$x$" control discs 39 and 40, the upper and lower "$y$" control discs 41 and 42, the vertical recording disc 19, and the horizontal compensating disc 17 rotate at the same speed.

Cooperating with the vertical recording disc 19 is a friction wheel 43 supported in the frame 44 and arranged for reciprocal movement along the carriage 45.

A friction wheel 46, supported in the frame 47 and arranged for reciprocal movement along the carriage 48, cooperates with the horizontal compensating disc 17.

In order to properly position the friction wheels 43 and 46, there is provided a horizontal control mechanism consisting generally of a pair of floats arranged to be responsive to vertical deviations. It will be seen that there is provided two columns 50 and 51 interconnected by a passage 52 and filled with any suitable liquid such as mercury. These columns are placed in alignment with the direction of travel of the vehicle upon which the apparatus is mounted. The greater the distance between the two columns the greater the sensitivity of the control mechanism. Pistons 53 and 54, provided with piston rods 55 and 56, float upon the columns 50 and 51, respectively. The free ends of the piston rods 55 and 56 are pivoted to a cross-bar 57 at points 58 and 59, respectively. Attached at the pivot point 58 is a flexible cord or tape 60 which passes over pulley 61, the tensioning apparatus 62 and then to the frame 47 of the horizontal compensating friction wheel 46. A similar flexible member 63 passes over pulley 64, the tensioning apparatus 65 and is also attached to the frame 47 of the horizontal compensating friction wheel 46. Assuming the piston 53 to be in the forward position, as the vehicle passes over horizontal terrain, both tapes 60 and 63 will be in a position which will allow the frame 47 to be in its extreme position and the horizontal compensating disc 17 will impart a maximum rotation to the friction wheel 46. If the vehicle starts down grade, the piston 53 will rise and the piston 54 lower, causing a slackening in tape 60 and a tautening of tape 63. The slack produced in the tape 60 will be absorbed by the tensioning apparatus 62. The tautening of tape 63 will cause a movement of the frame 47 towards the center of the horizontal compensating disc 17 proportionate to the grade being traversed. The movement of the friction wheel 46 towards the center of the horizontal compensating disc will cause a lessening of the speed of rotation imparted to the friction wheel. The wheel and disc are so proportioned that the movement thus imparted will be such that the speed of rotation of the friction wheel 46 will be directly proportional to the cosine of the slope over which the vehicle is being carried.

Similarly, when the vehicle goes up grade, the piston 54 rises and the piston 53 lowers, producing a slackening of the tape 63 and a tautening of the tape 60. The tautening of the tape 60 produces the same movement of the frame 47, the slack produced in the tape 63 being absorbed by the tensioning apparatus 65. A spring 67 is provided to return the frame 47 to its extreme position away from the center of the horizontal compensating disc 17.

To properly position the frame 44 carrying the vertical recording friction wheel 43, a cord or tape 70 has one end attached at the pivot point 58 and passes over pulley 71, around pulley 72, and over pulley 73. The other end of tape 70 is attached at the pivot point 59. The frame 44 is adjustably attached to the tape 70. In operation, the frame 44 is attached to the tape 70 so that, when the horizontal control mechanism is level, the friction wheel 43 is in the center of the vertical recording disc 19. It will be clear that the shifting of the pistons 53 and 54, as described above, will cause a movement of the frame 44 to one side or the other of the vertical recording disc 19; to the left for down grade and to the right for up grade. At its center position, no rotation will be imparted to the friction wheel 43 by the vertical recording disc 19. Rotation of the friction wheel 43 proportional to the distance from the center will be produced as the frame 44 is shifted and will be in the opposite sense on opposite sides of the center. The friction wheel 43 and the vertical recording disc 19 are so proportioned that the movement thus imparted will be such that the speed of rotation of the friction wheel 43 will be directly proportional to the sine of the slope over which the vehicle is being carried.

The friction wheel 43 is splined to the shaft 76 and drives a cable 75 which, in turn, operates any suitable indicating device 77, the construction and operation of which are well known in present-day practice. However, we prefer to use the type of indicating device in which a linear trace is produced as a resultant of longitudinal and transverse movement of the recording stylus such as is shown in United States Letters Patent No. 618,878, granted January 3, 1899, to M. A. Batson, et al.

The friction wheel 46 is splined to the shaft 80 and drives the auxiliary shaft 81 through gearing 82. The auxiliary shaft 81 in turn drives the secondary power shaft 83 through gearing 84. The secondary power shaft 83 drives the "x" recording disc 85 through shaft 86 and gearing 87. The "y" recording disc 88 is driven by the secondary power shaft 83 through gearing 90 and shaft 91. If the type of indicating device 77 used requires a horizontal feed, it may be actuated by gearing 92 and shaft 93.

Arranged to contact either the upper "x" control disc 39 or the lower "x" control disc 40 is a friction wheel 100 carried in a frame 101 arranged for reciprocal movement along the carriage 102. A similar wheel 103 is provided for the upper and lower "y" control discs 41 and 42 and is carried by frame 104 arranged for reciprocal movement along the carriage 105. The frame 101 and the frame 104 are interconnected by the spacing member 106. For the purposes of clarity, the member 106 has been shown in a position corresponding to a right turn of the vehicle. The member 106 carries a rack arranged to be engaged by gear 107, operated by the steering mechanism. The spacing member 106 is of a length to position the frames 101 and 104 a distance apart equal to the distance between the centers of the "x" and "y" control discs. When the vehicle is steering directly forward, the friction wheels 100 and 103 are centered on their respective discs and no rotation is imparted to them. As the vehicle is turned to the left or right, the gear 107 actuates the rack on the supporting member 106 and moves the frames 101 and 104 to the corresponding side of the centers of the "x" and "y" control discs. It will be seen that, depending upon which side of the center the friction wheel is placed, will determine the direction of rotation of the wheel. The wheels are arranged to be shifted from contact with the upper to the lower disc every alternate 180° rotation of the vehicle which also acts to reverse the direction of rotation of the friction wheel. Any suitable mechanical arrangement may be used for this purpose such as the cams 109 arranged to contact the projections 116 on the frame 101 and 104 and trip the frame from one disc to the other.

The friction wheel 100 is splined to the shaft 110 which is provided on either side of the portion centered about the "x" recording disc 85 with a geometrical worm gear 111 proportioned according to the sine of a constant radius moved through an arc of 90°. Cooperating with the worm gear 111 is a frame 112 carrying friction wheel 113 arranged for contact with the "x" recording disk 85. The friction wheel 113 is splined to the shaft 114 which drives the cable 115 connected to the indicating device 77.

Friction wheel 103 is splined to shaft 120 which is provided with a similar worm gear 121 cooperating with frame 122 to properly position the friction wheel 123. The friction wheel 123 is splined to the shaft 124 which drives the cable 125 connected to the indicating device 77. Flexible joints 108 allow the splined portions of the shafts 110 and 120 to afford a direct drive to the worm gear portions 111 and 121 while the friction wheels 100 or 103 are in contact with either the upper or lower control disc.

It will be seen that due to the geometrical cut of the worm gears 111 and 121 the speed of rotation imparted to the friction wheels 113 and 123 respectively will be, for constant grades, proportional to the rate of turning of the vehicle.

To sum up the operation of my device, it will be seen that, as the vehicle traverses the ground to be mapped, a rotation is imparted to the vertical recording disc 19 and the horizontal compensating disc 17. The position of the pistons 53 and 54 determines the position of friction wheel 43 and consequently the speed of rotation and the direction of rotation of the wheel which, in turn, controls the position of the vertical component of the indicating device.

Similarly, the position of the pistons 53 and 54 determines the position of the friction wheel 46 whereby a velocity directly proportional to the true horizontal path is imparted to the "x" recording disc and the "y" recording disc.

The direction of travel controls the position of member 106 and, through its associated apparatus, the position of the friction wheels 100 and 103 which, in turn, position the friction wheels 113 and 123. It will be clear that the velocity of the friction wheels 113 and 123 will be dependent upon two factors, the rate of climb and the degree of turning. Thus the speed imparted to the "x" and "y" cables is directly proportional to the true "x" and "y" components of travel.

In connection with the indicating device 77, there may be provided a numbering machine which will stamp the vertical elevation at various points along the horizontal traverse.

The above-described apparatus provides an arrangement whereby a true scale map may be made directly by a traverse over the terrain and which will permit either an open or closed traverse to be recorded.

While we have described our invention with reference to a single embodiment thereof, it is to be understood that we do not wish to be limited to the particular details and assemblies described, since obvious modifications within the spirit of the invention will suggest themselves to one skilled in the art.

Having described our invention, what we claim as new and wish to secure by Letters Patent is:

1. A mapping machine, comprising a first recording mechanism arranged to give an indication of the $x$ coordinates, said first mechanism including a drive wheel associated with an $x$ recording disc, a second recording mechanism arranged to give an indication of the $y$ coordinates, said second mechanism including a drive wheel associated with a $y$ recording disc, means associated with said drive wheels for shifting their relative position with respect to the axes of said discs in accordance with the deviation of said machine from the $x$ axis, and means to vary the speed at which said discs are operated directly as the cosine of the angle of the slope over which the machine is traversed, said last mentioned means including a horizontal compensating disc, a drive wheel associated with said compensating disc, and leveling means arranged to shift said drive wheel relative to the axis of said compensating disc.

2. A mapping machine comprising dual recording mechanisms including an indicator adapted to indicate in a traverse the path of said machine with reference to a pair of coordinate axes, each of said mechanisms including a recording disk and a drive wheel in driven relation with said disk, means in connection with said drive wheels for shifting their relative postions along the axes of said disks in accordance with the deviation of said machine from one of said coordinate axes, and means to vary the speed at which said disks are rotated directly as the cosine of the angle of slope of the surface traversed by said machine, said last-mentioned means including a compensating disk, a drive wheel associated with said compensating disk, and leveling means arranged to shift said drive wheel relative to the axis of said compensating disk.

3. A mapping machine comprising dual recording mechanisms including an indicator adapted to indicate in a traverse the path of said machine with reference to a pair of coordinate axes, each of said mechanisms including a recording disk and a drive wheel in driven relation with said disk, means in connection with said drive wheels for shifting their relative positions along the axes of said disks in accordance with the deviation of said machine from one of said coordinate axes, and means to vary the speed with which said disks are rotated directly as the cosine of the angle of slope of the surface traversed by said machine, said last-mentioned means including a level controlled rotary member connected to drive said disks in synchronism.

4. A mapping machine comprising dual recording mechanisms including an indicator adapted to indicate in a traverse the path of said machine with reference to a pair of coordinate axes, each of said mechanisms including a recording disk and a drive wheel in driven relation with said disk, means in connection with said drive wheels for shifting their relative positions along the axes of said disks in accordance with the deviation of said machine from one of said coordinate axes, and means to vary the speed with which said disks are rotated directly as the cosine of the angle of slope of the surface traversed by said machine, said last-mentioned means including a compensating disk, a drive wheel mounted to be driven by said disk, and leveling means arranged to shift said drive wheel relative to the axis of said compensating disk.

5. A mapping machine comprising dual recording mechanisms including an indicator adapted to indicate in a traverse the path of said machine with reference to a pair of coordinate axes, each of said mechanisms including a recording disk and a drive wheel in driven relation with said disk, means in connection with said drive wheels for shifting their relative positions along the axes of said disks in accordance with the deviation of said machine from one of said axes, and means to vary the speed at which said disks are rotated directly as the cosine of the angle of slope of the surface traversed by said machine, said last-mentioned means including a compensating disk, a drive wheel associated with said disk, and float-actuated leveling means arranged to shift said drive wheel relative to the axis of said disk, said drive wheel being connected to drive said recording disks in synchronism.

6. A mapping machine comprising dual recording mechanisms including an indicator adapted to indicate in a traverse the path of said machine with reference to a pair of coordinate axes, each of said mechanisms including a recording disk and a drive wheel in driven relation with said disk, means in connection with said drive wheels for shifting their relative positions along the axes of said disks in accordance with the deviation of said machine from one of said coordinate axes, said means including a control mechanism embodying two pairs of vertically spaced rotary disks operable at the same speed, a friction wheel between each pair of disks, said friction wheels being alternately engageable with the opposing faces of said disks and simultaneously shiftable along the axis thereof in accordance with the turning movement of said vehicle, and means to vary the speed at which said recording disks are rotated directly as the cosine of the angle of slope of the surface traversed by said machine, said last-mentioned means including a compensating disk, a drive wheel associated with said disk, and float-actuated leveling means arranged to shift said drive wheel relative to the axis of said disk, said drive wheel being connected to drive said recording disks in synchronism.

7. A mapping machine comprising dual recording mechanisms including an indicator adapted to indicate in a traverse the path of said machine with reference to a pair of coordinate axes, each of said mechanisms including a recording disk and a drive wheel in driven relation with said disk, means in connection with said drive wheels for shifting their relative positions along the axes of said disks in accordance with the deviation of said machine from one of said coordinate axes, said means including a control mechanism embodying two pairs of vertically spaced rotary disks operable at the same speed, a friction wheel between each pair of disks, said friction wheels being alternately engageable with the opposing faces of said disks with each 180° turn thereof and simultaneously shiftable along the axes of said disks in accordance with the turning movement of said machine, and means to vary the speed at which said recording disks are rotated directly as the cosine of the angle of slope of the surface traversed by said machine, said last-mentioned means including a compensating disk, a drive wheel associated with said disk, and float-actuated leveling means arranged to shift said drive wheel relative to the axis of said disk, said drive wheel being connected to drive said recording disks in synchronism.

ROLAND C. HOLMES.
IRVING SAROKIN.

CERTIFICATE OF CORRECTION.

Patent No. 2,337,044.                                               December 21, 1943.

ROLAND C. HOLMES, ET AL.

It is hereby certified that error appears in the above numbered patent requiring correction as follows: In the heading to the drawing, name of inventor, for "R. C. HOLMES" read --R. C. HOLMES ET AL--; and that the said Letters Patent should be read with this correction therein that the same may conform to the record of the case in the Patent Office.

Signed and sealed this 9th day of May, A. D. 1944.

Leslie Frazer

(Seal)                                                    Acting Commissioner of Patents.